(12) United States Patent
Noh et al.

(10) Patent No.: US 9,798,957 B2
(45) Date of Patent: Oct. 24, 2017

(54) ROBOT CLEANER AND CONTROL METHOD THEREOF

(71) Applicant: LG Electronics Inc., Seoul (KR)

(72) Inventors: Dongki Noh, Seoul (KR); Seungwook Lim, Seoul (KR); Taekyeong Lee, Seoul (KR); Inbo Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/868,828

(22) Filed: Sep. 29, 2015

(65) Prior Publication Data

US 2016/0089783 A1    Mar. 31, 2016

(30) Foreign Application Priority Data

Sep. 30, 2014    (KR) .................. 10-2014-0131526

(51) Int. Cl.
*G06K 9/52*    (2006.01)
*G06K 9/62*    (2006.01)
(Continued)

(52) U.S. Cl.
CPC ......... *G06K 9/6267* (2013.01); *G05D 1/0225* (2013.01); *G05D 1/0246* (2013.01);
(Continued)

(58) Field of Classification Search
CPC ........ B25J 9/163; B25J 9/1697; B25J 9/1664; G06K 9/00671; G06K 9/6262;
(Continued)

(56) References Cited

U.S. PATENT DOCUMENTS

2001/0018640 A1    8/2001  Matsunaga
2003/0120389 A1*   6/2003  Abramson ............... A47L 5/22
                                                        700/245
(Continued)

FOREIGN PATENT DOCUMENTS

CN    102831427 A    12/2012
KR    10-1072876 B1  10/2011
(Continued)

OTHER PUBLICATIONS

Radu B Rusu et al: "Towards 3D Point Cloud based object maps for household environments", Robotics and Autonomous Systems, Elsevier Science Publishers, Amsterdam, NL, vol. 56, No. 11.

*Primary Examiner* — Yon Couso
(74) *Attorney, Agent, or Firm* — Dentons US LLP

(57) ABSTRACT

A control method for a robot cleaner includes acquiring a plurality of images of surroundings during travel of the robot cleaner in a cleaning area, estimating a plurality of room-specific feature distributions according to a rule defined for each of a plurality of rooms, based on the images acquired while acquiring the plurality of images, acquiring an image of surroundings at a current position of the robot cleaner, obtaining a comparison reference group including a plurality of room feature distributions by applying the rule for each of the plurality of rooms to the image acquired while acquiring the image at the current position, comparing the obtained comparison reference group with the estimated room-specific feature distributions, and determining a room from the plurality of rooms having the robot cleaner currently located therein.

15 Claims, 13 Drawing Sheets

(51) Int. Cl.
*G06K 9/00* (2006.01)
*G05D 1/02* (2006.01)
*G06K 9/46* (2006.01)

(52) U.S. Cl.
CPC ....... *G05D 1/0274* (2013.01); *G06K 9/00671* (2013.01); *G06K 9/52* (2013.01); *G06K 9/6201* (2013.01); *G06K 9/6262* (2013.01); *G05D 2201/0203* (2013.01); *G06K 2009/4666* (2013.01); *Y10S 901/01* (2013.01)

(58) Field of Classification Search
CPC ............... G06K 9/6201; G06K 9/6267; G06K 2009/4666; G06K 9/52; G05D 2201/0203; G05D 1/0246; G05D 1/0274; G05D 1/0225; Y10S 901/01
See application file for complete search history.

(56) References Cited

U.S. PATENT DOCUMENTS

2010/0070125 A1 3/2010 Lee et al.
2016/0298970 A1* 10/2016 Lindhe ................ G05D 1/0248

FOREIGN PATENT DOCUMENTS

KR 10-2013-0000278 A 1/2013
WO 2012008703 A2 1/2012

\* cited by examiner

ROOM 1

(P11) : 1.5
(P12) : 2.1
(P13) : 1.0
(P14) : 2.3
(P15) : 1.5

ROOM N (PN1) : 0.8
(PN2) : 1.1
(PN3) : 1.2
(PN4) : 2.5
(PN5) : 1.3

RULE FOR ROOM 1 APPLIED:

HISTOGRAM 1

RULE FOR ROOM N APPLIED:

HISTOGRAM N

ROBOT CLEANER AND CONTROL METHOD THEREOF

CROSS-REFERENCE TO RELATED APPLICATION

This application claims the priority benefit of Korean Patent Application No. 10-2014-0131526, filed on Sep. 30, 2014 in the Korean Intellectual Property Office, the disclosure of which is incorporated by reference for all purposes as if fully set forth herein.

BACKGROUND

Field of the Disclosure

The present disclosure relates to a robot cleaner and a control method for the same.

Description of the Related Art

Robots have been developed to be used in industries to contribute to a part of factory automation. Recently, with expansion of robotics, medical robots and aerospace robots have been developed, and robots which can be used at home have also been developed. Among such robots, robots capable of autonomously traveling are referred to as mobile robots.

A typical example of mobile robots for home use is a robot cleaner. The robot cleaner is a home appliance that performs cleaning operation by suctioning dust or debris while moving about an area to be cleaned. The robot cleaner is capable of autonomously traveling since it is provided with a rechargeable battery. When remaining battery life is insufficient for operation, or cleaning is completed, the robot cleaner autonomously moves to a charging base and recharges the battery.

Conventionally, the robot cleaner searches for a charging base by sensing, through an infrared sensor, an infrared (IR) signal transmitted from the charging base. Moreover, various methods for the robot cleaner to create a map of a cleaning area based on surrounding information retrieved during travel are known. The created map contains information about the position of the charging base.

When recharging is needed, the robot cleaner needs to accurately recognize the position thereof on the map in order to correctly return to the charging base. Accordingly, in the case in which the position of the moving robot cleaner is forcibly changed by an external factor (for example, in a case in which a user moves the moving robot cleaner to another room), the robot cleaner cannot recognize the position thereof on a currently created map or a previously created map. As a result, the robot cleaner cannot return to the charging base. In this case, the robot cleaner searches for the IR signal transmitted from the charging base at the current position again. However, if the robot cleaner performs search for the charging base without knowing the position thereof as in the above example, it may sense the signal by chance, but in most cases, it runs out of battery, while wandering around searching for the signal. This problem also occurs when the robot clear creates a map of surroundings again at the moved position. As long as the robot cleaner fails to recognize the position thereof on the map of the entire cleaning area, return to the charging base raises a question of whether or not the signal transmitted from the charging base can be detected at the changed position and still depends on trial and error. Therefore, a global localization method with which the robot cleaner can recognize the current position thereof on a whole map is needed.

The problem of failure to return to the charging base described above is an example of problems that may occur in a robot cleaner which is not provided with a function of global localization. Various other problems may occur in such robot cleaner. For example, recently, a technology of setting the cleaning range using a terminal (e.g., a remote control, a smartphone, etc.) that communicates with the robot cleaner over a network is increasingly widely used. Even in this case, setting the cleaning range through a terminal may be accurately performed only when the cleaning range is based on global localization.

SUMMARY

Therefore, in view of the above problems, and it is an objective to provide a robot cleaner traveling based on global localization and a control method for the same.

Another object is to provide a robot cleaner that accurately performs return to a charging base and a control method for the same.

Another object is to provide a robot cleaner capable of quickly recognizing the position thereof even if moved to any position by the user during travel, and a control method for the same.

A further object is to provide a robot cleaner capable of quickly re-recognizing the current position thereof based on an image obtained at the current position upon failing to recognize the position thereof on a map and a control method for the same.

In accordance with one, the above and other objects can be accomplished by the provision of a control method for a robot cleaner including acquiring a plurality of images of surroundings during travel of the robot cleaner in a cleaning area, estimating a room-specific feature distribution according to a rule defined for each of a plurality of rooms, based on the images acquired in the acquiring the plurality of images, acquiring an image of surroundings at a current position of the robot cleaner, obtaining a comparison reference group including a plurality of room feature distributions by applying the rule for each of the plurality of rooms to the image acquired while acquiring the image at the current position, and comparing the obtained comparison reference group with the estimated room-specific feature distribution and determining a room from the plurality of rooms having the robot cleaner currently located therein.

In accordance with another there is provided a control method for a robot cleaner including acquiring a plurality of images of surroundings by moving the robot cleaner in a cleaning area, detecting a plurality of room features in a plurality of images acquired for each of a plurality of rooms, creating a plurality of labels for the room features, scoring each of the labels, and estimating and storing a label-specific score distribution for each of the rooms, according to a rule defined for each of the rooms, and acquiring an image of surroundings after the label-specific score distributions are stored, creating a plurality of labels for a plurality of room features for the image according to the rule for each of the rooms, obtaining a comparison reference group including a plurality of label-specific score distributions according to the rule defined for each of the rooms, determining a room having the robot cleaner currently located therein based on the comparison reference group and the label-specific score distribution estimated for each of the rooms.

In accordance with another, there is provided a robot cleaner including an image acquisition unit to acquire a plurality of images of surroundings of the robot cleaner, a feature distribution learning module to estimate a plurality of room-specific feature distributions according to a rule defined for each of a plurality of rooms, based on the images acquired through the image acquisition unit, and a position recognition module to obtain a comparison reference group including a plurality of room feature distributions by applying the rule for each of the rooms to an image acquired at a current position of the robot cleaner through the image acquisition unit and to compare the comparison reference group with the room-specific feature distributions estimated through the feature distribution learning module and determine a room from the plurality of rooms having the robot cleaner currently located therein.

BRIEF DESCRIPTION OF THE DRAWINGS

The above and other objects, features and other advantages will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. However, the present invention is not limited to the disclosed embodiments, but may be implemented in various different forms. The disclosed embodiments are simply intended to provide thorough understanding of the present invention for those skilled in the art. Wherever possible, the same reference numbers may be used throughout the drawings to refer to the same or like parts.

Figure 1:
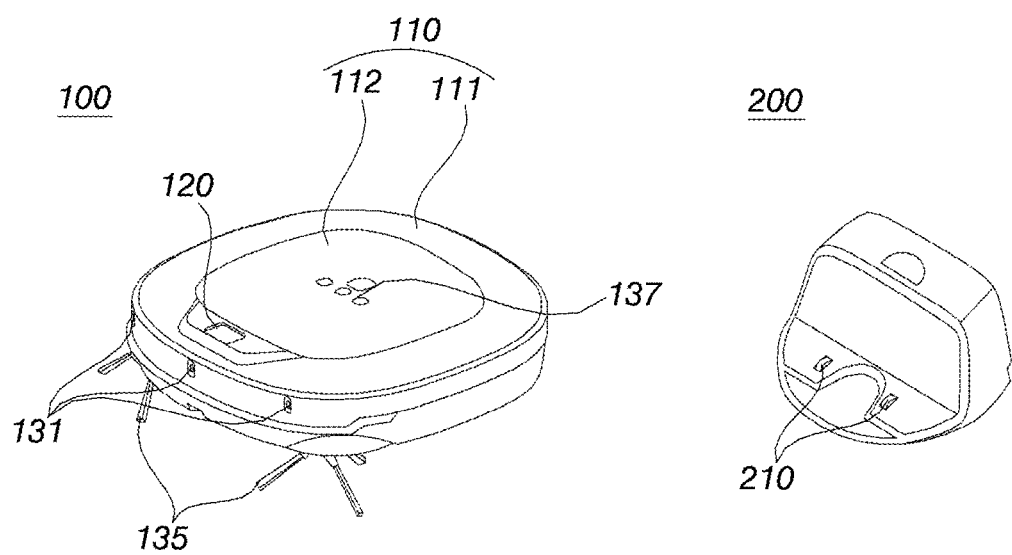
FIG. 1 is a perspective view showing a robot cleaner and a charging base for recharging the robot cleaner according to one embodiment of the present invention.
Figure 2:
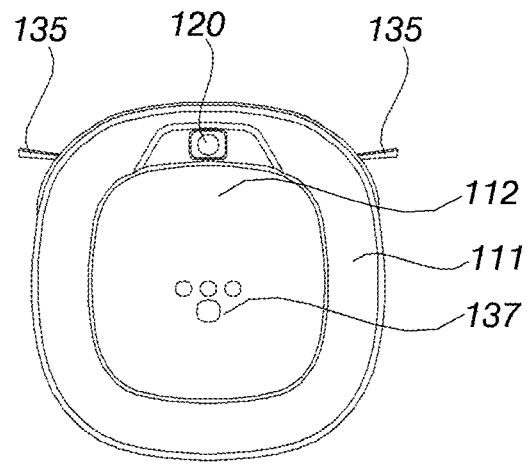
FIG. 2 is a view showing the top surface part of the robot cleaner shown in FIG. 1.
Figure 3:
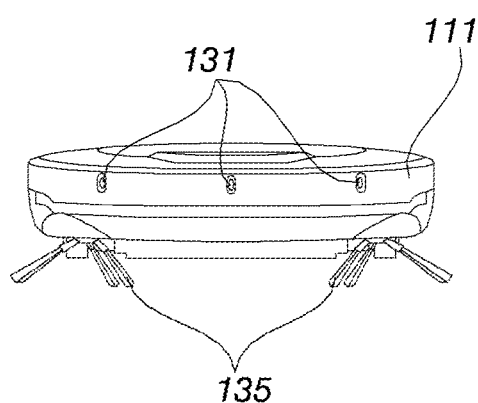
FIG. 3 is a view showing the front surface part of the robot cleaner shown in FIG. 1.
Figure 4:
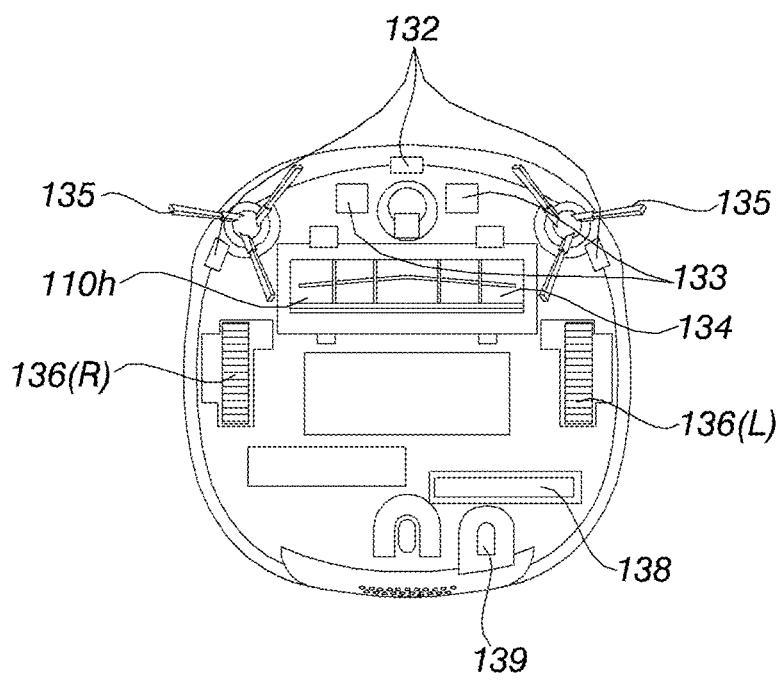
FIG. 4 is a view showing the bottom surface part of the robot cleaner shown in FIG. 1.
Figure 5:
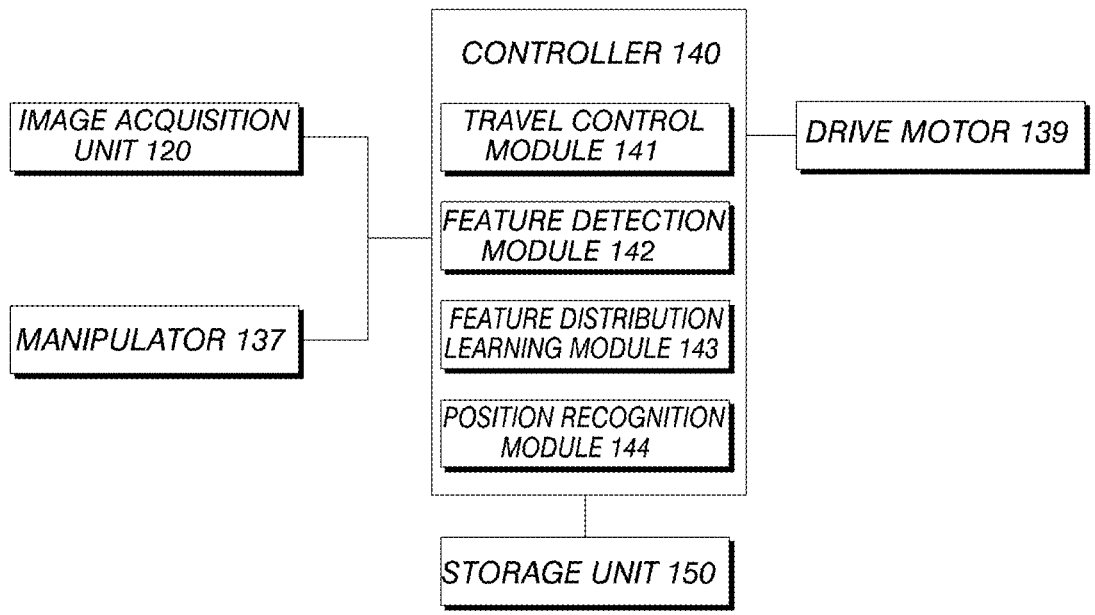
FIG. 5 is a block diagram illustrating a control relationship between main parts of the robot cleaner.

FIG. 1 is a perspective view showing a robot cleaner 100 and a charging base 200 for recharging the robot cleaner according to one embodiment of the present invention. FIG. 2 is a view showing the top surface part of the robot cleaner shown in FIG. 1. FIG. 3 is a view showing the front surface part of the robot cleaner shown in FIG. 1. FIG. 4 is a view showing the bottom surface part of the robot cleaner shown in FIG. 1. FIG. 5 is a block diagram illustrating a control relationship between main parts of the robot cleaner.

Referring to FIGS. 1 to 4, the robot cleaner 100 may include a body 110 and an image acquisition unit 120 to acquire an image of the surroundings of the body 110. In defining parts of the body 110 in this specification, a part facing the ceiling within a cleaning area is defined as a top surface part (see FIG. 2), a part facing the floor within the cleaning area is defined as a bottom surface part (see FIG. 4), and a part facing in the travel direction of a portion disposed between the top surface part and the bottom surface part to form the circumference of the body 110 is defined as a front surface part (see FIG. 3).

The body 110 is provided with at least one drive wheel 136 to move the body 110, and the drive wheel 136 is driven by a drive motor 139. The drive wheel 136 may include wheels provided to the left and right sides of the body 110. Hereinafter, these wheels will be respectively referred as a left wheel 136(L) and a right wheel 136(R).

The left wheel 136(L) and the right wheel 136(R) may be driven by one drive motor. If necessary, a left wheel drive motor to drive the left wheel 136(L) and a right wheel drive motor to drive the right wheel 136(R) may be provided. The travel direction of the body 110 may be changed to the left or right by making the left wheel 136(L) and the right wheel 136(R) have different rates of rotation.

A suction port 110h to suction air may be formed at the bottom surface part of the body 110. The interior of the body 110 may be provided with a suction device (not shown) to provide suction force to cause air to be suctioned through the suction port 110h and a dust container (not shown) to collect dust suctioned together with air through the suction port 110h.

The body 110 may include a case 111 defining a space to accommodate various components constituting the robot cleaner 100B. An opening allowing insertion and retrieval of the dust container therethrough may be formed in the case 111, and a dust container cover 112 to open and close the opening may be rotatably provided to the case 111.

The body may include a roll-shaped main brush having bristles exposed through the suction port 110h and an auxiliary brush 135 positioned at the front of the bottom surface part of the body 110 and provided with bristles forming a plurality of radially extending blades. Dust is removed from the floor within the cleaning area by rotation of the brushes 134 and 135. The dust separated from the floor in this way is suctioned through the suction port 110h and collected in the dust container.

A battery 138 serves to supply power not only for the drive motor but also for overall operations of the robot cleaner 100. When the battery 138 of the robot cleaner 100 is running out, the robot cleaner 100 may perform return travel to the charging base 200 to charge the battery. During the return travel, the robot cleaner 100 may autonomously detect the position of the charging base 200.

The charging base 200 may include a signal transmitting unit (not shown) to transmit a predetermined return signal. The return signal may include, but is not limited to, a ultrasonic signal or an infrared signal.

The robot cleaner 100 may include a signal sensing unit (not shown) to receive the return signal. The charging base 200 may transmit an infrared signal through the signal transmitting unit, and the signal sensing unit may include an infrared sensor to sense the infrared signal. The robot cleaner 100 moves to the position of the charging base 200 according to the infrared signal transmitted from the charging base 200 and docks with the charging base 200. By docking, charging of the robot cleaner 100 is performed between a charging terminal 133 of the robot cleaner 100 and a charging terminal 210 of the charging base 200.

The image acquisition unit 120, which is configured to photograph the cleaning area, may include a digital camera. The digital camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may not only produce a still image, but also a moving image including frames consisting of still images.

Preferably, the image acquisition unit 120 is provided to the top surface part of the body 110 to acquire an image of the ceiling within the cleaning area. However, the position and capture range of the image acquisition unit 120 are not limited thereto. For example, the image acquisition unit 120 may be arranged to acquire an image of the front of the body 110.

The robot cleaner 100 may further include a sheer drop sensor 132 to sense presence of a sheer drop of the floor within the cleaning area and a lower camera sensor 139 to acquire an image of the floor.

Referring to FIG. 5, the robot cleaner 100 may include a controller 140 and a storage unit 150. The controller 140 controls overall operation of the robot cleaner 100 by controlling various elements (e.g., the image acquisition unit 120, a manipulator 137, the drive motor 139, etc.) constituting the robot cleaner 100. Particularly, the controller 140 may include a travel control module 141, a feature detection module 142, a feature distribution learning module 143, and a position recognition module 144. For instance, the controller may be a microprocessor or custom integrated circuit executing various kinds of information.

The storage unit 150 serves to record various kinds of information necessary for control of the robot cleaner 100 and may include a volatile or non-volatile recording medium. The recording medium serves to store data which is readable by a microprocessor and may include a hard disk drive (HDD), a solid state drive (SSD), a silicon disk drive (SDD), a ROM, a RAM, a CD-ROM, a magnetic tape, a floppy disk, and an optical data storage unit.

A map of the cleaning area may be stored in the storage unit 150. The map may be input by an external terminal capable of exchanging information with the robot cleaner 100 through wired or wireless communication, or may be constructed by the robot cleaner 100 through self-learning. In the former case, examples of the external terminal may include a remote control, a PDA, A laptop, a smartphone, a tablet, and the like in which an application for configuring a map is installed.

Positions of rooms within the cleaning area may be marked on the map. In addition, the current position of the robot cleaner 100 may be marked on the map and updated during travel of the robot cleaner 100.

The travel control module 141, which is configured to control travel of the robot cleaner 100, controls operation of the drive motor 139 according to the travel setting. In addition, the travel control module 141 may recognize a path of the robot cleaner 100 based on operation of the drive motor 139. For example, the travel control module 141 may recognize the present or past movement speed and travel distance of the robot cleaner 100 based on the rate of rotation of the drive wheel 136, and also recognize a sequence of changes of travel direction at the present or in the past according to the direction of rotation of the respective drive wheels 136(L) and 136(R). The position of the robot cleaner 100 on the map may be updated based on the travel information about the robot cleaner 100 recognized as above.

Figure 6:
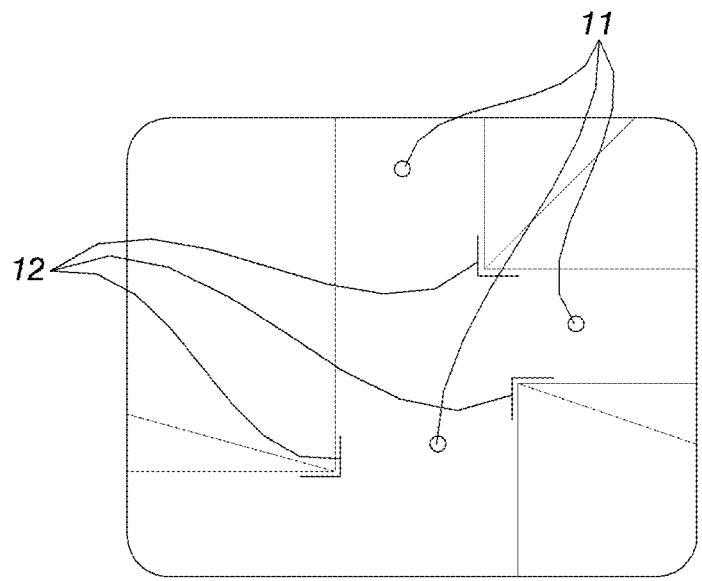
FIG. 6 is an image captured in a room within a cleaning area.

While the robot cleaner 100 is traveling, the image acquisition unit 120 acquires images of the surroundings of the robot cleaner 100. Hereinafter, an image acquired by the image acquisition unit 120 will be also called "acquired image." Preferably, the image acquisition unit 120 acquires at least one acquired image in each room marked on the map. FIG. 6 shows an image captured in a certain room within the cleaning area. Various features such as lamps 11 arranged on the ceiling and corners 12 of walls are visible in the image.

The feature detection module 142 detects features in each acquired image. Various feature detection methods are known in the field of computer vision. The features include an edge, a corner, a blob, and a ridge, and various feature detectors suitable for detection of these features are known. Examples of feature detectors include Canny, Sobel, Harris & Stephens/Plessey, SUSAN, Shi & Tomasi, level curve curvature, FAST, Laplacian of Gaussian, Difference of Gaussians, Determinant of Hessian, MSER, PCBR, and grey-level blob detectors.

Figure 8:
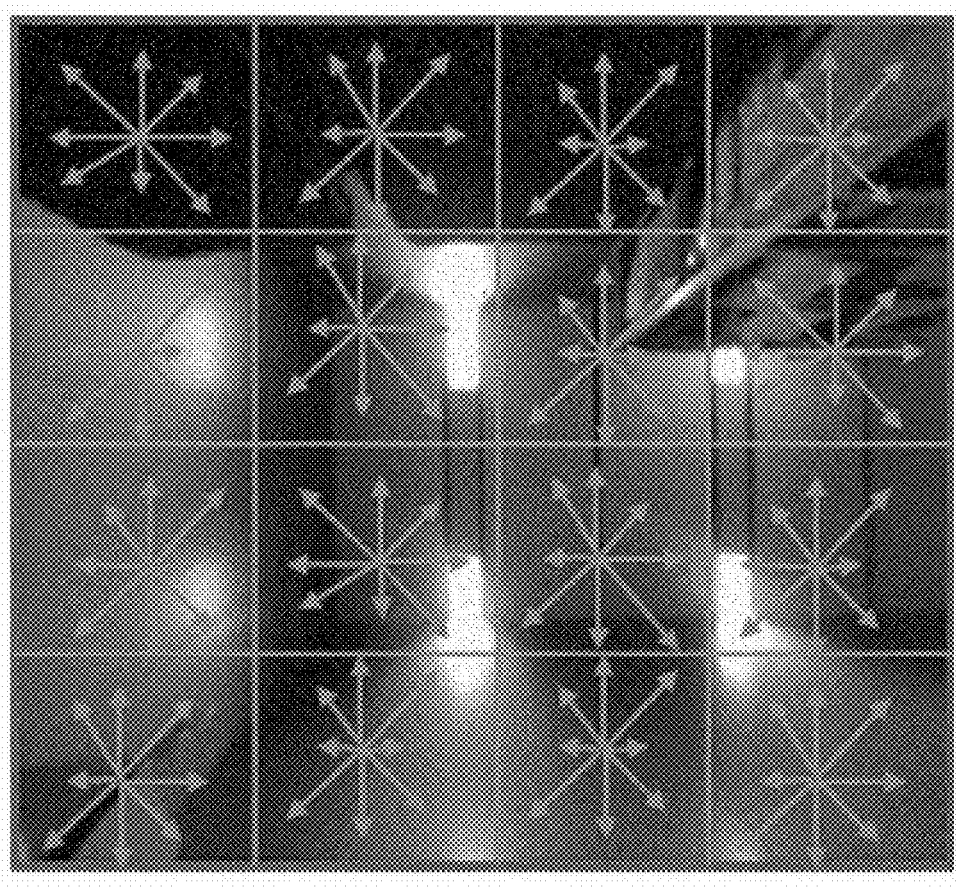
FIG. 8 is a view illustrating feature vectors extracted through scale invariant feature transform (SIFT) to detect features.

FIG. 8 is a view illustrating feature vectors extracted by scale invariant feature transform (SIFT) to detect features. SIFT is an image recognition technique of selecting key points such as corner points which are easy to identify from an image, obtaining a histogram for distribution properties (direction and rate of change of brightness) of brightness gradient of a certain area of pixels around each key point, and estimating vectors of 128 dimensions from the values of bins of the histogram.

SIFT can detect features invariant of the scale, rotation, and change of brightness of an object in an image. Accordingly, with SIFT, an invariant (i.e., rotation-invariant) feature of a region can be detected even if images of the region is captured by changing the orientation of the robot cleaner 100. However, embodiments of the present invention are not limited thereto. Various other techniques (e.g., Histogram of Oriented Gradient (HOG), Haar feature, Fems, Local Binary Pattern (LBP), and Modified Census Transform (MCT)) can be applied.

The feature distribution learning module 143 creates labels for features detected through the feature detection module 142, scores the labels, and estimates a score distribution of labels for each image (hereinafter, referred to as an image-specific label-score distribution) and a score distribution of labels for each room (hereinafter, referred to as a room-specific label-score distribution) based on the estimated image-specific label-score distributions. Image-specific label-score distributions and room-specific label-score distributions, which will be describe in more detail later, are used to determine the current position of the robot cleaner 100 by comparing them with an image acquired at the current position when the robot cleaner 100 fails to recognize the position thereof on the map (for example, when the position of the robot cleaner 100 traveling based on the map is suddenly changed). Hereinafter, a series of steps performed to estimate a room-specific label-score distribution will be referred to as a feature distribution learning process, and a process of recognizing the current position of the robot cleaner 100 based on a room-specific label-score distribution and an image-specific label-score distribution will be referred to as a position recognition process. The current position of the robot cleaner 100 can be determined in the full range of the cleaning area through the feature distribution learning process and the position recognition process (global localization).

Figure 7:
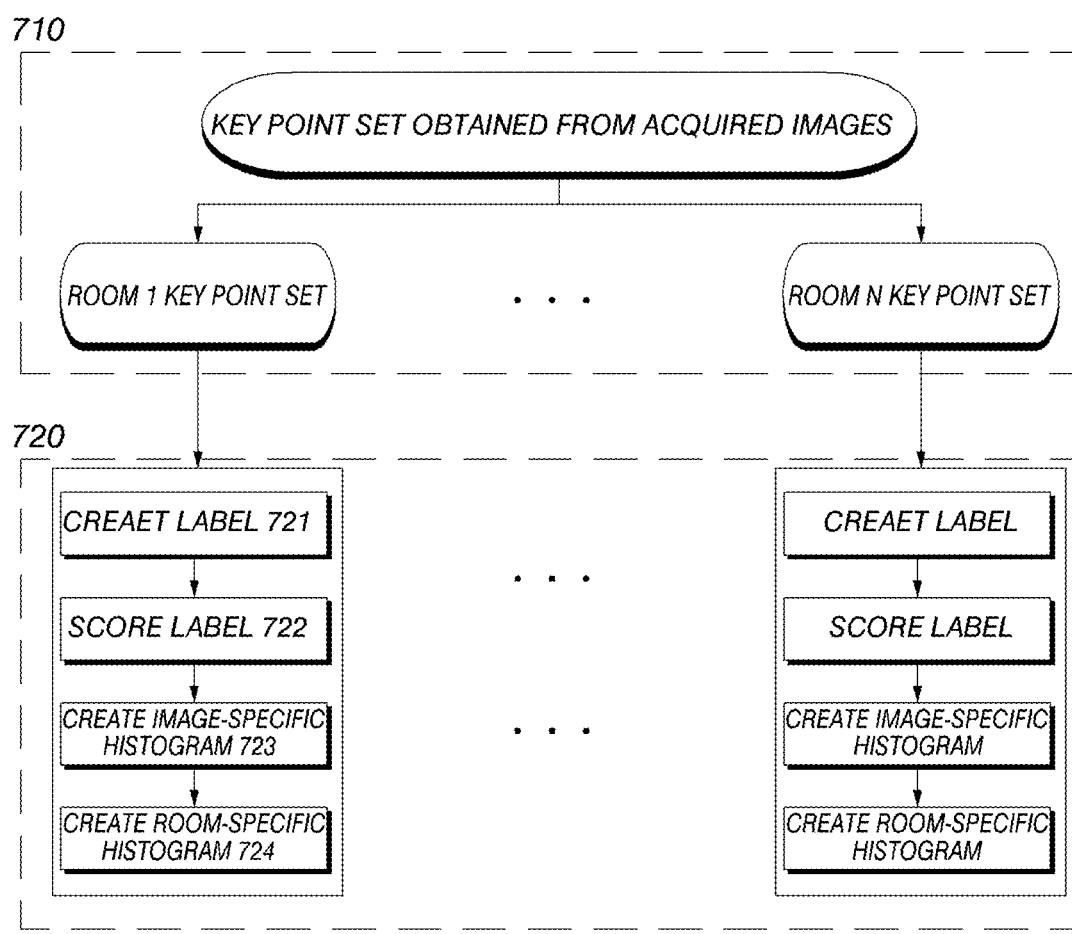
FIG. 7 is a schematic diagram illustrating a process in which a map is learned by a feature distribution learning module.

FIG. 7 is a schematic diagram illustrating a process in which a map is learned by a feature distribution learning module. Referring to FIG. 7, the feature detection module 142 implements feature detection of acquired images at different positions of the cleaning area. The acquired images are classified according to room and written in the storage unit 150 as a database. If N rooms are present in the cleaning area, at least one image is preferably captured in each room, and features are detected from the acquired images. Herein, the images acquired in a room may include images captured by changing the orientation of the robot cleaner 100 in the room (e.g., images acquired by rotating the robot cleaner 100 in place) or images captured by the position of the robot cleaner 100. The robot cleaner 100 can acquire images by changing the posture or position thereof to any posture or position, which is referred to as a feature detection action. The feature detection action may be performed in every room within the cleaning area. Hereinafter, the process of detecting the entire cleaning area by performing the feature detection action will be referred to as feature detection operation. The feature detection operation may be performed according to a predetermined command input through a manipulation unit 137. Alternatively, the feature detection operation may be performed when the robot cleaner 100 returns to the charging base 200 to be charged. In this regard, if images are acquired in the full range of the cleaning area through the feature detection operation and written in the storage unit 150, the robot cleaner 100 need not perform the feature detection operation to return to the charging base.

Labels are created for the features detected from the acquired images (721), and scored (722). At this time, creating and scoring labels are performed according to rules defined for each room. The rules are preferably different among the rooms.

Figure 9:
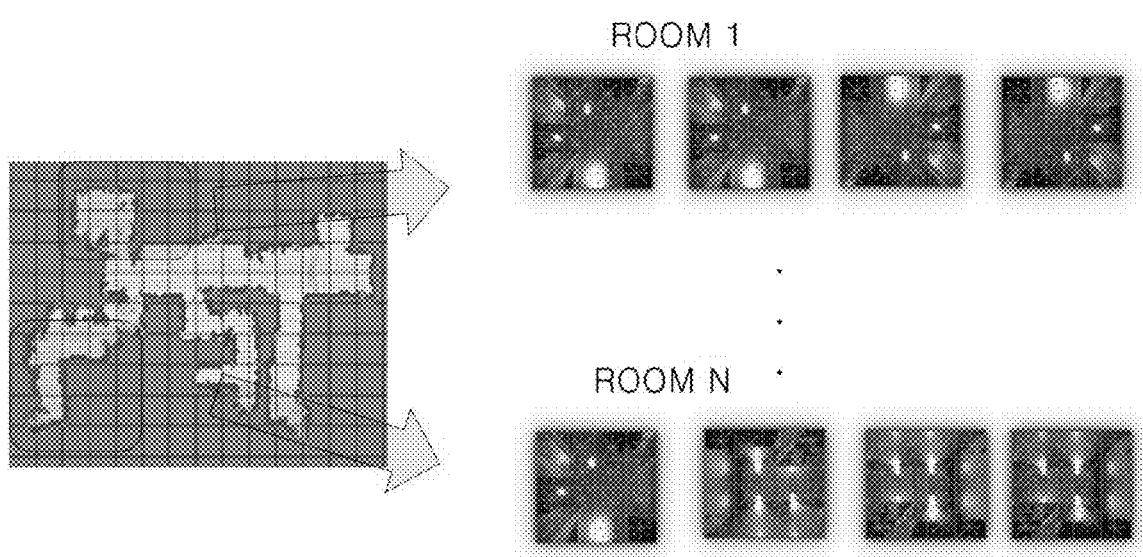
FIG. 9 illustrates classification of acquired images according to rooms for a cleaning area having N rooms.

For example, FIG. 9 illustrates classification of acquired images according to rooms for a cleaning area having N rooms. The arrows indicated in eight directions in each image are descriptors that describe features in the acquired images using the SIFT technique. The feature distribution learning module 143 classifies descriptors according to rules defined for the rooms and creates the same label for similar features. Herein, the labels are defined according to the rules defined for each room.

Figure 10:
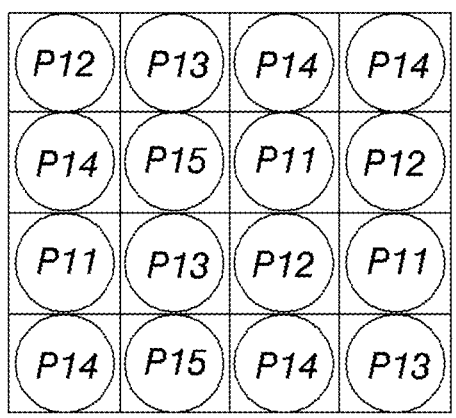
FIG. 10 shows display of labels assigned to features detected in images classified according to rooms on an acquired image.
Figure 10:
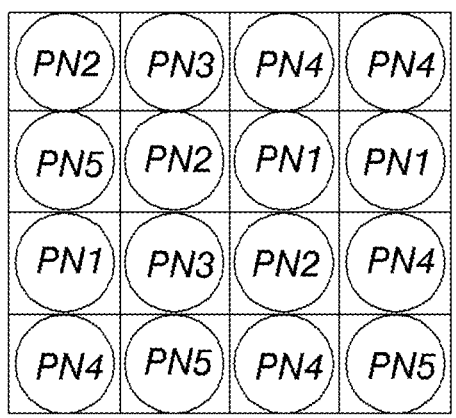

FIG. 10 shows display of labels assigned to features detected in images classified according to rooms on an acquired image. In this embodiment, features are classified into five labels according to the rules defined for the respective rooms. However, the number of labels is not limited thereto.

In the image acquired from room 1, labels of P11, P12, P13, P14, and P15 are created for the detected features according to a rule for room 1. In the image acquired from room 1, labels of PN1, PN2, PN3, PN4, and PN5 are created for the detected features according to a rule for room N. In this manner, labels are created for each of N rooms according to the rules defined for the respective rooms. Creation of the labels is performed by the feature distribution learning module 143.

In addition, the feature distribution learning module 143 scores the labels according to the rule defined for each room. For example, as shown in FIG. 10, labels P11, P12, P13, P14, and P15 created based on the images acquired in room 1 are respectively scored 1.5, 2.1, 1.0, 2.3 and 1.5 points, and labels PN1, PN2, PN3, PN4, and PN5 created from the acquired images of another room (e.g., room N) are scored according to a reference different from the reference for the labels of room 1. In this embodiment, PN1, PN2, PN3, PN4, and PN5 for another room are respectively scored 0.8, 1.1, 1.2, 2.5, 1.3 points.

Now that labels have been created for each acquired image and scored, an image-specific feature distribution can be estimated. Hereinafter, the image-specific feature distribution will be represented by an image-specific histogram, in which the length of a bar represents multiplication of the appearance frequency of a label in an acquired image by the score of the label.

Figure 11:
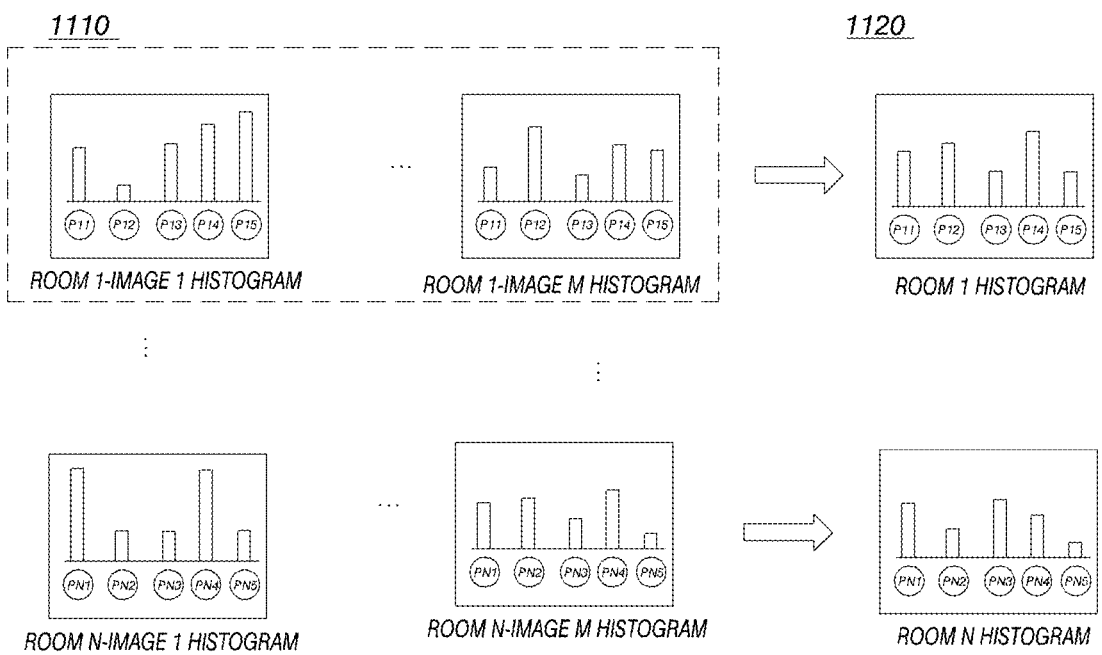
FIG. 11 illustrates a process of estimating room-specific feature distributions based on image-specific histograms obtained from images acquired in all N rooms.

The feature distribution learning module 143 can estimate a room-specific feature distribution (e.g., a room-specific label-score distribution) based on image-specific feature distributions (e.g., image-specific label-score distributions). FIG. 11 illustrates a process of estimating room-specific feature distributions based on image-specific histograms obtained from images acquired in all N rooms. Hereinafter, the room-specific feature distribution will be denoted by a histogram 1120 and referred to as room-specific histogram.

The room-specific histogram 1120 is obtained by averaging the scores of each label in the image-specific histograms estimated in each room. That is, as shown in FIG. 11, by averaging scores of each of labels P11 to P15 in the respective image-specific histograms (from room 1-image 1 histogram to room 1-image M histogram) estimated based on M images acquired from room 1, a histogram for room 1 (room 1 histogram) can be estimated. The feature distribution learning module 143 can estimate N room-specific histograms by performed the process described above. The estimated room-specific histograms are stored in the storage unit 150.

Since a room-specific feature distribution (a room-specific histogram) reflects distribution of features in a room, it can be an indication to identify the room, and an image-specific feature distribution can be an indication to specifically identify a position at which the corresponding image has been acquired in the room. Particularly, since the position of the robot cleaner 100 on the map is continuously sensed by the travel control module 141 while traveling of the robot cleaner 100 about the map is normally controlled, where the robot cleaner 100 is in the room can be recognized when images are acquired by the image acquisition unit 120. Accordingly, when the position information about the robot cleaner 100 recognized based on the map is considered, an image-specific feature distribution can be an indication to identify a position in a particular room where an image is obtained.

Now that the indication to identify a room (the room-specific feature distribution) and the indication to identify a room (the image-specific feature distribution) have been found, a position recognition process using the indications will be described below.

Figure 12:
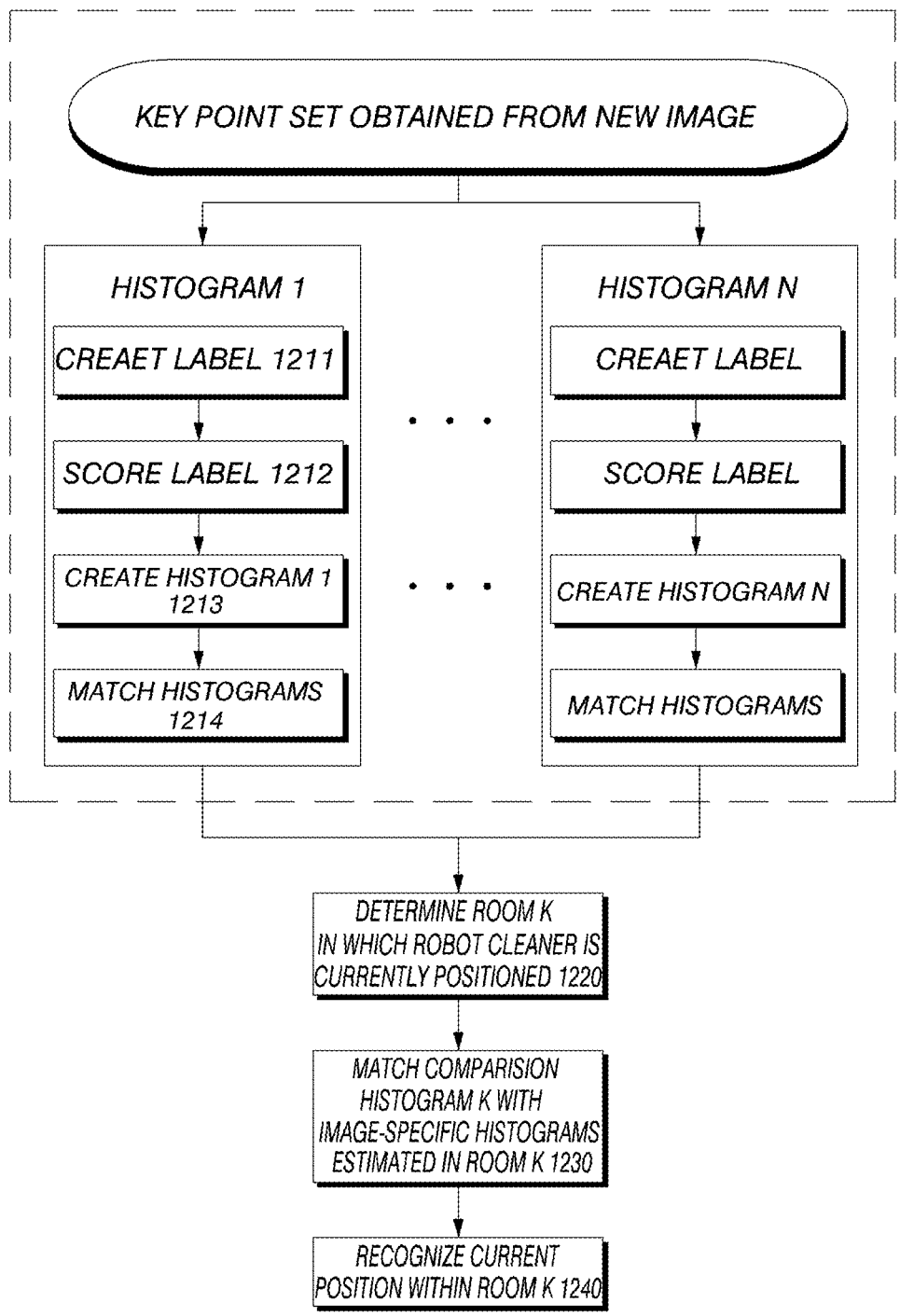
FIG. 12 is a schematic diagram illustrating a process of a position recognition module recognizing the position of the robot cleaner.

FIG. 12 is a schematic diagram illustrating a process of a position recognition module recognizing the position of the robot cleaner. Referring to FIG. 12, the position recognition process includes the steps of the robot cleaner 100 acquiring an image of surroundings (e.g., a ceiling image) at a current position, detecting features in the acquired image, and estimating N feature distributions by applying, to the detected features, a rule defined for each room (a rule applied to each room in the feature distribution learning process).

The process of detecting features in the acquired image, creating labels and scoring the labels may be performed according to the rules applied to the respective rooms in the feature distribution learning process. The number of rules defined for the respective rooms may correspond to the number N of the rooms. Accordingly, the N feature distributions (hereinafter, exemplarily described as histograms) obtained from the acquired images by applying these rules forms a comparison reference group used for the robot cleaner 100 to identify a room where the robot cleaner 100 is currently located. The position recognition module 144 may compare the feature distributions constituting the comparison reference group (hereinafter, referred to as the feature distributions of the comparison reference group) with room-specific feature distributions estimated in the feature distribution learning process, thereby determining a room in which an image is acquired at the current position.

Since a room-specific feature distribution is obtained by averaging scores of each label for multiple images acquired in the corresponding room, it may not accurately coincide with any of the feature distributions of the comparison reference group. Accordingly, by estimating a room-specific feature distribution that most closely approximates one of the feature distributions of the comparison reference group, the position recognition module 144 may determine a room in which an image is acquired at the current position.

Figure 13:
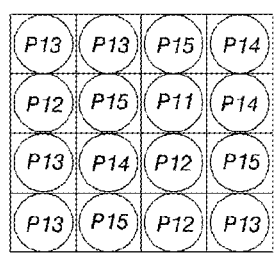
FIG. 13 illustrates creating labels by applying room-specifically defined rules (rules applied in the feature distribution learning process) to an image acquired at the current position of the robot cleaner and scoring the labels to create N comparison histograms.
Figure 13:
Figure 13:
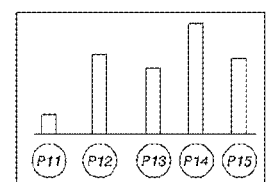
Figure 13:
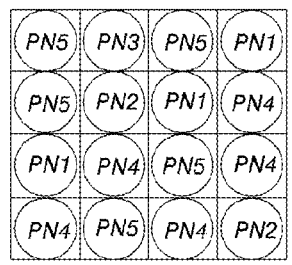
Figure 13:
Figure 13:
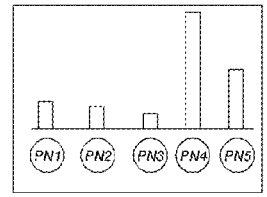

Hereinafter, the position recognition process will be described in more detail with reference to FIGS. 13 to 15. FIG. 13 illustrates creating labels by applying room-specifically defined rules (rules applied in the feature distribution learning process) to an image acquired at the current position of the robot cleaner and scoring the labels to create N comparison histograms. The N comparison histograms are obtained from the same image. However, since the comparison histograms are obtained by applying rules defined according to the rooms, they have different references for creating and scoring labels. Preferably, N different comparison histograms may be obtained. Now, the position recognition module 144 compares these N comparison histograms with N room-specific histograms obtained in the feature distribution learning process.

Figure 14:
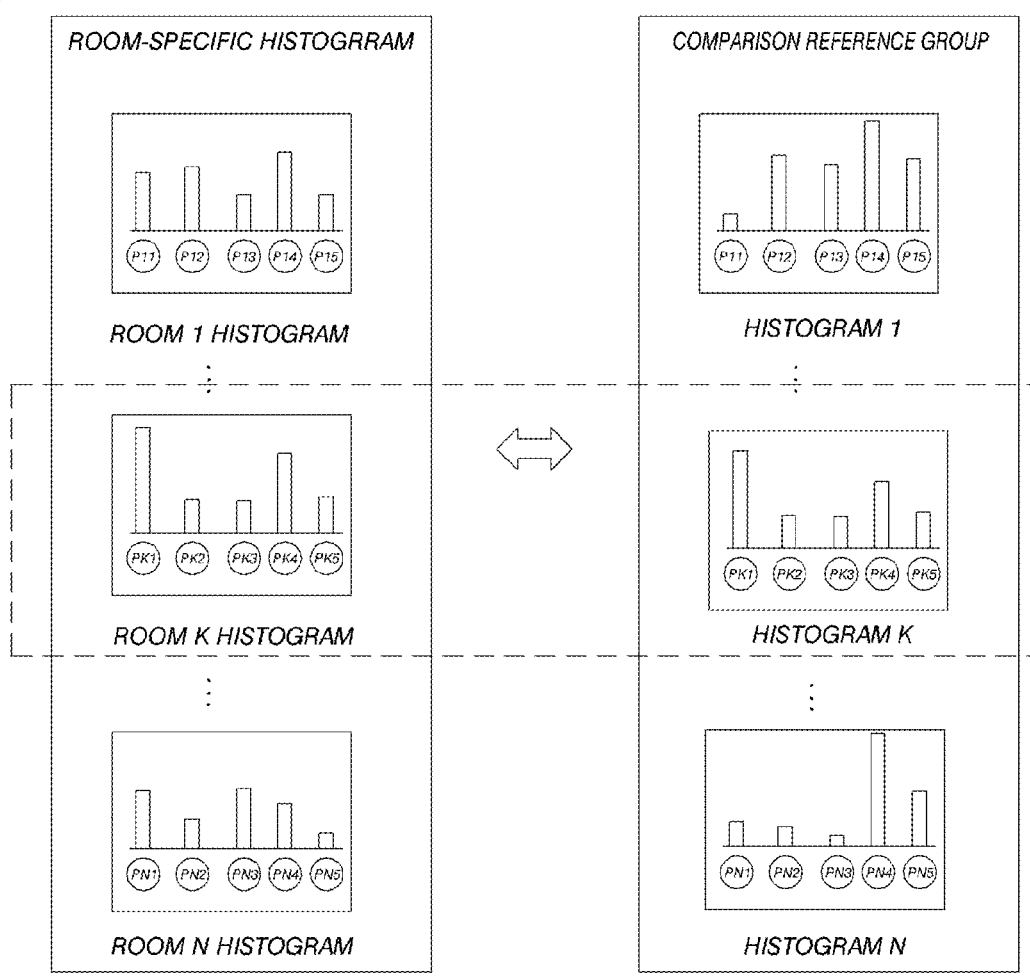
FIG. 14 illustrates matching N room-specific histograms (Room 1 histogram to N histogram) with N comparison histograms (comparison histogram 1 to comparison histogram N)

FIG. 14 illustrates matching N room-specific histograms (from Room 1 histogram to Room N histogram) with N comparison histograms (from comparison between histogram 1 to comparison histogram N). As shown in FIG. 14, in comparison between the room-specific histograms and the comparison histograms, a comparison histogram K obtained by applying the rule for room K to the image acquired at the current position is found to most closely approximate the histogram of room K (Room K histogram) obtained in the feature distribution learning process. Accordingly, in this case, the position recognition module 144 determines that the robot cleaner 100 is currently located in room K.

If the robot cleaner 100 is allowed to determine the current position thereof based on the image acquired at the current position as above, the robot cleaner 100 may recognize the current position thereof even when the position of the robot cleaner 100 discontinuously changes on the map, for example, when traveling is performed without the travel control module 141 recognizing the progress of travel, and thus the robot cleaner 100 cannot recognize the position thereof on the map based on the travel information obtained from the travel control module 141.

In another example, in a case in which the robot cleaner 100 autonomously cleaning a living room based on a map pre-stored in the storage unit 150 is moved from the path to a room other than the living room by a user and caused to travel in the room, the conventional method of recognizing the position depending on the map only according to the travel record obtained from the travel control module 141 only causes the controller 140 to recognize that the robot cleaner 100 is still in the living room. On the other hand, if the position recognition process is performed based on an image acquired in the new room as proposed in the present invention, the robot cleaner 100 may recognize a room where the robot cleaner 100 is placed. Accordingly, with the proposed position recognition process, it may be possible for the robot cleaner 100 to recognize a room on the map where it is located and to implement global localization-based control of traveling based on the map.

Figure 15:
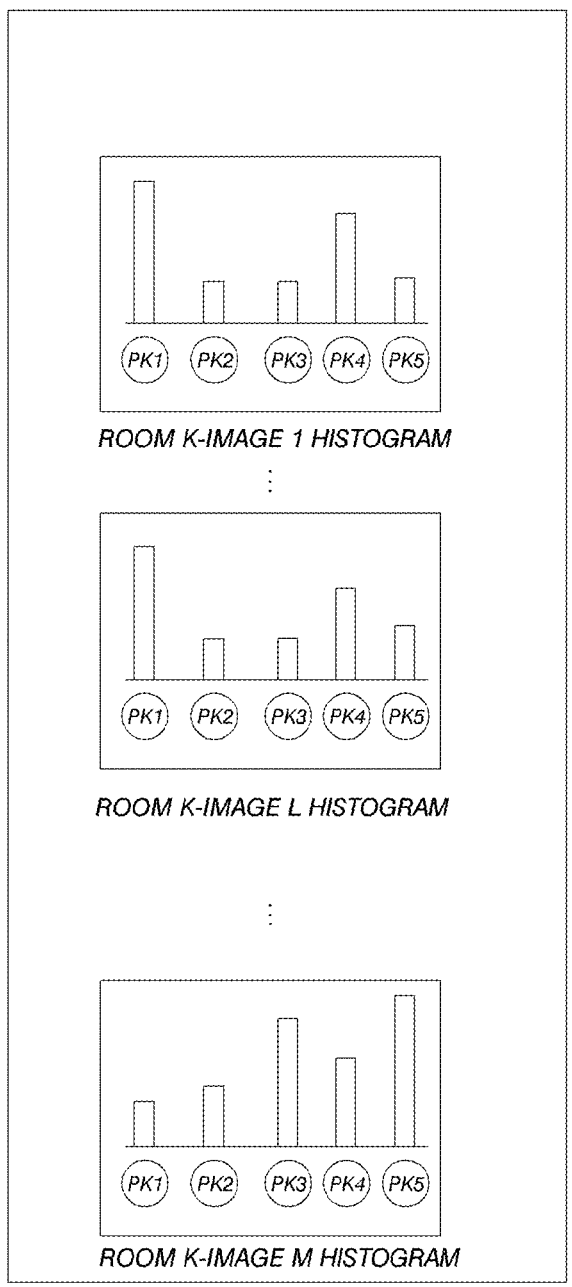
FIG. 15 illustrates comparison between comparison histogram K obtained from an image acquired at the current position and a histogram obtained from images acquired in room K through the feature distribution learning process.
Figure 15:
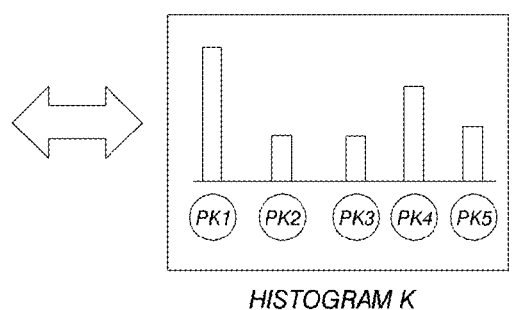

FIG. 15 illustrates comparison between comparison histogram K obtained from an image acquired at the current position and a histogram obtained from images acquired in room K through the feature distribution learning process.

Room k is a room in which the robot cleaner 100 is currently located as recognized by the position recognition module 144, and M histograms obtained from M images acquired within room K are respectively denoted by room K-image 1 histogram to room K-image M histogram in the figure. Comparison histogram K most approximates Room K image L, and the position recognition module 144 may determine that the robot cleaner 100 is currently located in room K, particularly at a place where image L has been acquired among the M images. Herein, the place where image L is acquired may be specified on the map according to the travel record obtained by the travel control module 141 in the feature distribution learning process.

As is apparent from the above description, with a robot cleaner and a control method for the same according to one embodiment of the present invention, the robot cleaner may accurately recognize the position thereof based on global localization.

Second, return to a charging base may be accurately performed.

Third, even if the traveling robot cleaner is moved to any location by a user, the robot cleaner can recognize the new location, and accordingly the robot cleaner may be prevented from wandering without recognizing the position thereof as in the conventional cases.

Fourth, the robot cleaner can quickly re-recognize the current position thereof based on an image obtained at the current position even when the robot cleaner is lost on the map.

Fifth, the robot cleaner identifies a room in which the robot cleaner is located by comparing an image acquired at the current position thereof with a room-specific feature distribution incorporating feature distributions obtained from images for the respective rooms rather than comparing the image acquired at the current position with features of all images obtained through a feature distribution learning process. Accordingly, the amount of data and time taken to match features may be reduced.

Various units and modules described herein may be implemented as portions of a microprocessor, micro-controller, or application specific integrated circuit executing various information or functions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method for a robot cleaner, comprising:
   acquiring a plurality of images of surroundings during travel of the robot cleaner in a cleaning area, by an image acquisition unit;
   estimating a plurality of room-specific feature distributions according to a rule defined for each of a plurality of rooms, based on the images acquired while acquiring the plurality of images, by a feature distribution learning module;
   acquiring an image of surroundings at a current position of the robot cleaner, by the image acquisition unit;
   obtaining a comparison reference group comprising a plurality of room feature distributions by applying the rule for each of the plurality of rooms to the image acquired while acquiring the image at the current position, by a position recognition module;
   comparing the obtained comparison reference group with the estimated room-specific feature distributions, by the position recognition module; and
   determining a room from the plurality of rooms having the robot cleaner currently located therein, by the position recognition module,
   wherein the estimating a plurality of room-specific feature distributions comprises:
   estimating a plurality of room feature distributions for the images acquired in the acquiring of the plurality of images; and
   estimating a room-specific feature distribution for each of the plurality of rooms from the images acquired based on the estimated feature distributions for the images,
   wherein the estimating of the plurality of room feature distributions comprises:
   detecting a plurality of room features in the images acquired in the acquiring of the plurality of images;
   creating a plurality of labels for the room features according to the rule defined for each of the rooms; and
   scoring the labels and estimating a label-specific score distribution for each of the images,
   wherein the estimating of the room-specific feature distribution comprises:
   estimating a label-specific score distribution for each of the rooms based on the label-specific score distribution for each of the images.

2. The control method according to claim 1, wherein the scoring of the labels is performed according to the rule defined for each of the rooms.

3. The control method according to claim 1, wherein the estimated label-specific score distribution for each of the rooms is obtained by averaging the label-specific score distributions for the images according to each of the rooms.

4. The control method according to claim 1, further comprising:
   comparing a feature distribution subjected to the rule for the room having the robot cleaner currently located therein among the feature distributions of the comparison reference group with the feature distributions for the images; and
   determining a region having the robot cleaner positioned therein in the room.

5. The control method according to claim 1, further comprising:
   recognizing a position of the robot cleaner based on a pre-stored map of the cleaning area,
   wherein the acquiring an image of surroundings, the obtaining a comparison reference group, and the comparing the obtained comparison reference group with the estimated the room-specific feature distribution are performed when the position of the robot cleaner on the map is not recognized.

6. The control method according to claim 5, wherein the map is input through an external terminal, the external terminal able to wirelessly communicate with the robot cleaner.

7. The control method according to claim 1, wherein the images of the surroundings are acquired by photographing a ceiling within the cleaning area.

8. The control method according to claim 1, wherein the rules for each of the rooms are different from each other.

9. A robot cleaner, comprising:
   an image acquisition unit to acquire a plurality of images of surroundings of the robot cleaner;
   a feature distribution learning module to estimate a plurality of room-specific feature distributions according to a rule defined for each of a plurality of rooms, based on the images acquired through the image acquisition unit;
   a position recognition module to obtain a comparison reference group comprising a plurality of room feature distributions by applying the rule for each of the rooms to an image acquired at a current position of the robot cleaner through the image acquisition unit and to compare the comparison reference group with the room-specific feature distributions estimated through the feature distribution learning module and determine a room from the plurality of rooms having the robot cleaner currently located therein; and
   a feature detection module to detect a plurality of room features in the images acquired by the image acquisition unit,
   wherein the feature distribution learning module creates, according to the rule defined for each of the rooms, a plurality of labels for the room features detected by the feature detection module, estimates a label-specific score distribution for each of the images by scoring the labels, and estimates a label-specific score distribution for each of the rooms based on the label-specific score distribution for each of the images.

10. The robot cleaner according to claim 9, wherein the feature distribution learning module estimates a room-specific feature distribution for each of the rooms used as the surroundings for the acquired images based on the room feature distributions for the images.

11. The robot cleaner according to claim 9, wherein the labels are scored according to the rule defined for each of the rooms.

12. The robot cleaner according to claim 9, wherein the estimated label-specific score distribution for each of the rooms is obtained by averaging the label-specific score distributions for the images according to each of the rooms.

13. The robot cleaner according to claim 10, wherein the position recognition module compares a feature distribution subjected to the rule for the room determined to have the robot cleaner currently located therein among the feature distributions of the comparison reference group with the feature distributions for the images acquired in the room determined to have the robot cleaner located therein, and determines a region having the robot cleaner positioned therein in the room.

14. The robot cleaner according to claim 9, wherein the image acquisition unit acquires the images by photographing a ceiling of a cleaning area.

15. A control method for a robot cleaner, comprising:
acquiring a plurality of images of surroundings by moving the robot cleaner in a cleaning area, by an image acquisition unit;
detecting a plurality of room features in a plurality of images acquired for each of a plurality of rooms, creating a plurality of labels for the room features, scoring each of the labels, and estimating and storing a label-specific score distribution for each of the rooms, according to a rule defined for each of the rooms, by a feature distribution learning module; and
acquiring an image of surroundings after the label-specific score distributions are stored, by an image acquisition unit;
creating a plurality of labels for a plurality of room features for the image according to the rule for each of the rooms, by the feature distribution learning module;
obtaining a comparison reference group comprising a plurality of label-specific score distributions according to the rule defined for each of the rooms, by the feature distribution learning module; and
determining a room having the robot cleaner currently located therein based on the comparison reference group and the label-specific score distribution estimated for each of the rooms, by the feature distribution learning module.

* * * * *